April 6, 1971  I. N. FEHR ET AL  3,574,039
FILM SEALING AND CUTTING APPARATUS
Filed Nov. 2, 1967
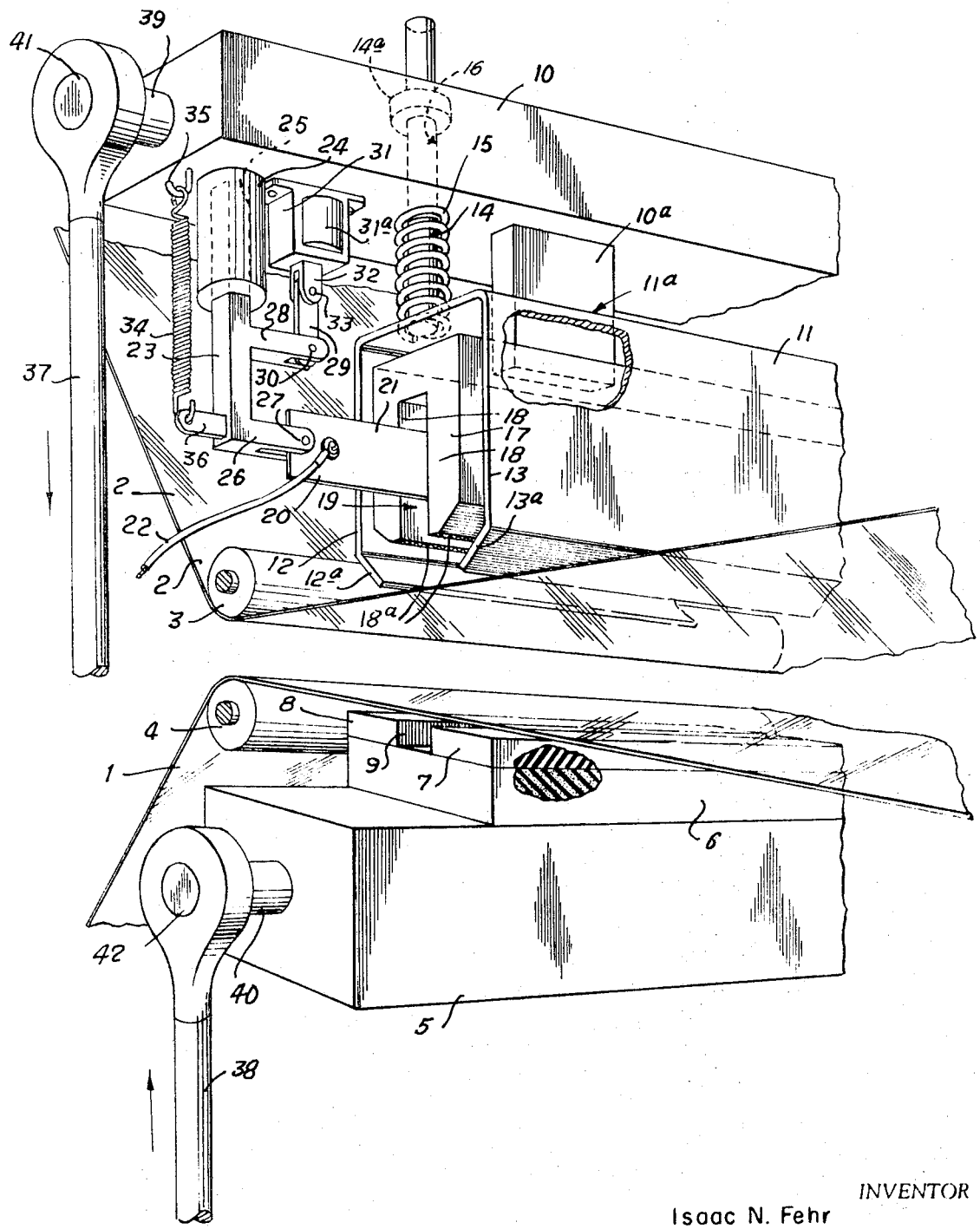
INVENTOR
Isaac N. Fehr
Sidney E. Cannon
W. DeWitt Goodman
Maurice Blais
BY Howard E. Moore
ATTORNEY United States Patent Office 3,574,039
Patented Apr. 6, 1971

3,574,039
FILM SEALING AND CUTTING APPARATUS
Isaac N. Fehr, Sidney E. Cannon, William De Witt Goodman, Dan Sutherland, and Frank Shelby, Dallas, Tex., and Maurice Blais, Providence, R.I., assignors to Campbell Taggart Associated Bakeries, Inc., Dallas, Tex.
Filed Nov. 2, 1967, Ser. No. 680,223
Int. Cl. B32b *31/08, 31/20*
U.S. Cl. 156—515                                                   14 Claims

ABSTRACT OF THE DISCLOSURE

A device for sealing and cutting plastic film in a machine for packaging substantially uniformly shaped articles such as buns and other bakery products, which includes a base member, a holddown member, a sealing bar and a hot ribbon cutter wherein the holddown member and sealing bar are arranged to come into pressure contact with layers of plastic film pressed thereunder, and the hot ribbon cutter is arranged to reciprocatingly come into contact between the spaced, parallel sealed surfaces of the film to sever same. This abstract should not be construed to limit the disclosure or the scope of the claims hereinafter annexed.

CROSS REFERENCE TO RELATED APPLICATIONS

This invention is an improvement in packaging machines like those disclosed in copending applications for patent Ser. No. 478,628, filed June 28, 1965, entitled "Continuous Flow Bun Packager" and Ser. No. 614,426, filed Feb. 7, 1967, entitled "Packaging Machine and Package Formed Thereby," wherein packages of bakery or other products are continuously formed and sealed about the edges in plastic sheet material such as polyethylene, polypropylene, Mylar, Saran and other sheet material, which may be sealed together by application of heat and pressure, and wherein the packages are cut apart and separated by a hot ribbon cutter operated in conjunction with a heated sealing bar.

SUMMARY OF INVENTION

Specifically, this invention relates to an improvement in the combination of a sealing bar and hot ribbon cutter used in such a machine, wherein the sealing bar is heated by induction from the hot ribbon cutter which is recessed in and passes outwardly of a slot provided longitudinally thereof. The inductive heat transferred to the sealing bar without physical contact therewith is sufficient to provide sealing and fusing heat to the layers of plastic film when pressed thereagainst so that it is not necessary to provide separate heater elements in the sealer bar, thereby eliminating electrical connections thereto as in previous constructions. Thus, the operation and construction is considerably simplified providing for more efficient and trouble-free operation.

It is, therefore, a primary object of the invention to provide a film sealer and hot ribbon cutter device wherein the sealer bar may be brought into sequenced contact with the layers of plastic packaging film passed thereunder to seal same, and the hot ribbon cutter may be brought into sequenced contact with the sealed surfaces to cut and sever same at selected, spaced intervals.

A still further object of the invention is to provide such a combination sealer bar and hot ribbon cutter wherein the sealer bar is heated by radiation from the hot ribbon cutter, which is normally recessed therein, but is arranged to move outwardly thereof to sever the sealing surfaces formed by the sealer bar.

Still another object of the invention is to provide mechanism in a packaging machine wherein packages of articles may be formed continuously as the contacting sheets of packaging material are sealed between selected groups of articles, and the sealed surfaces are severed by reciprocating movement of the hot ribbon cutter into contact therewith.

Still another object of the invention is to provide film sealing and cutting mechanism wherein two sheets of plastic film are moved between a base member and a holddown member, sealing bar and hot ribbon cutter assembly wherein the holddown member is brought into engagement with the film to press same against the base, the sealing bar is moved into sealing engagement with the contacting layers of plastic film to seal same along spaced transverse lines and the hot ribbon cutter is recessed in the sealing bar, but is arranged to come into cutting contact between the sealed lines formed by the sealing bar to sever the layers of film therebetween.

A general object of the invention is to provide means for holding down, sealing and severing layers of plastic film in sequenced operation to permit continuous formation of packages of articles sealed in plastic film.

Other and further objects of the invention will become apparent upon reading the detailed specification hereinafter following and by referring to the drawing annexed hereto.

BRIEF DESCRIPTION OF THE DRAWING

A suitable embodiment of the invention is shown in the attached drawing wherein, The drawing is a perspective end view of one end of the sealing and cutting mechanism, incorporating the improvements described and claimed herein.

DESCRIPTION OF THE PREFERRED EMBODIMENT

Numeral references are employed to indicate the various parts shown in the drawing and like numerals indicate like parts throughout the various figures of the drawing.

The numerals 1 and 2 indicate sheets of plastic packaging film, such as polyethylene, Saran, Mylar, or other type of heat and pressure sealing film which are withdrawn from storage rolls (not shown), and passed about guide rollers 3 and 4. The film would move to the right as viewed in the figure, and groups of substantially uniformly shaped bakery products or other articles to be packaged would be passed therebetween from a conveyor as disclosed in co-pending application Ser. No. 614,426. The film is initially sealed together transversely thereof in the manner hereinafter described and the groups of articles being packaged push the film to the right and withdraw same from the storage rolls, which would be to the left as viewed in the figure, as the packages are successively formed and cut apart in the manner hereinafter described.

A rigid base or pickup bar 5 is made of rigid material such as metal and has secured to the upper surface thereof a layer of resilient sponge plastic or rubber material 6.

Secured to the upper surface of the sponge rubber material 6 are spaced strips of relatively harder, resilient rubber or plastic material which are spaced apart to provide a channel 9 therebetween for the purpose hereinafter mentioned. An upper bar 10 is made of rigid material such as steel and has secured thereto, and depending therefrom, a suspension arm 10a. The suspension arm 10a slidably passes through a correspondingly shaped passage 11a provided through the upper wall of the holddown member 11 and is secured to sealing bar 17.

The holddown member 11 is a shell-like member which is provided with side walls 12 and 13 terminated at their lower edges by inwardly turned jaws 12a and 13a, leaving a space between said jaws through which the sealing jaws 18 of the sealing bar 17, hereinafter described, may pass to come into engagement with the layers of film 1 and 2 to seal same together in the manner hereinafter described.

A pin 14 is secured to the upper surface of the holddown member 11 and slidably extends through a bore 16 provided through the bar 10. A stop collar 14a is provided on pin 14 arranged to contact the upper surface of bar 10 to limit downward movement of holddown member 11 and prevent same from contacting seal bar 17 for the purpose hereinafter mentioned.

The pressure seal bar 17 is made of rigid heat conducting material which has a rectangular shaped channel 19 formed lengthwise thereof, providing spaced jaws 18 which are terminated along their lower edges by sealing surfaces 18a of reduced width. The sealing surfaces 18a may be smooth or may be knurled or otherwise finished to provide a roughened surface thereon in order to penetratingly engage the film to provide a firm and integrated seal therebetween.

A so-called "hot ribbon" cutter 20, is a relatively thin strip of resistance material which becomes white hot when an electrical current is passed therethrough.

The "hot ribbon" cutter 20 may be supplied with current and heated through power supply lines 22 enclosed within a suitable insulator, it being understood that the electrical circuit is completed by a supply line attached to the other end of the cutter 20.

A knife support and control arm 23 is slidably disposed in a guide 24 which is rigidly supported by the bar 10. The guide 24 has a bore 25 therein in which the upper end of the arm 23 may slidably move.

An inwardly extending arm 26 is provided on the lower end of the control arm 23 which is bifurcated on the outer end to straddle the end of the cutter 20 and is secured to the cutter by means of an appropriate attachment pin 27.

An arm 28 extends inwardly of the control arm 23 above the arm 26 and has a bifurcated end thereon which straddles the lower end of a link 29 and is secured thereto by means of an appropriate pin 30. The upper end of the link 29 is secured between a bifurcated attachment lug 32 which extends downwardly from a solenoid core and is secured thereto by an appropriate pin 33. The lug 32 is attached to the movable core (not shown) of the solenoid 31a which is mounted in the support housing 31 secured to the lower surface of the bar 10.

A spring is attached at its upper end to a hook 35 secured to the lower surface of the bar 10 and is attached at its lower end to an outwardly extending arm 36 on the control arm 23.

Drive arms 37 and 38 are pivotally secured to the mounting pins 39 and 40 secured to and extending outwardly from the ends of the bars 5 and 10. The upper ends of the arms 37 and 38 are pivotally secured about the mounting pins 39 and 40, as indicated at 41 and 42.

The drive arms 37 and 38 are arranged to reciprocatingly move in opposite direction as indicated by arrows so as to move the bars 5 and 10 toward or away from each other in unison.

The arms 37 and 38 may be vertically moved by any appropriate means such as a cam arrangement or by a compound linkage arrangement as disclosed in said copending application. Such mechanism is conventional and is not necessary to illustrate same herein.

It will be understood that the bars 5 and 10 extend transversely of the packaging machine and that the element shown in the figure, and described hereinabove, would be duplicated at the other end of the machine.

The operation and function of the device hereinbefore described is as follows:

The sheets of plastic film 1 and 2 are passed about the rollers 3 and 4 as shown in the figure and drawn between the upper and lower sealing and cutting components as hereinbefore described. Initially the edges of the sheets 1 and 2 are free as shown in the figure, but in order to initiate the operation of the device, bars 10 and 12 are brought toward each other, thereby causing the holddown member 11 to engage and press the sheets against the base members 7 and 8. The sealing bar 18 is then brought downwardly to provide a seal therebetween so that groups of articles being packaged may be moved by conveyor against the sealed edges to thereby withdraw the sheets of plastic material from the storage rollers as a continuous operation is carried out in the manner disclosed in said co-pending application, and as hereinafter described.

The sealing bar 17 is suspended to the support bar 10 by the attachment arm 10a secured between said members. The attachment arm 10a slidably extends through passage 11a provided in the upper wall of the holddown member 11 so that the sealing bar 17 is suspended to suspension bar 10.

As the arms 37 and 38 are moved toward each other as shown in the figure, the bar 10 and attached assemblages, and the bar 5 with attached parts move toward each other. As they move toward each other, the jaws 12a and 13a of holddown member 11 engage the upper sheet of plastic material 1 and the sheets of plastic material are brought together against the resilient base members 7 and 8. After the jaws 12a and 13a are brought into position to be urged against the resilient base members 7 and 8, same will be held in such position, and as the bar 10 continues to move downwardly, the arm 10a will slide through the passage 11a thereby moving the sealing head 17 downwardly with relation to the jaws 12a and 13a. At the same time the pin 14 moves upwardly in the bore 16 compressing the spring 15. Thus, the sealing surfaces 18a will be pressed into engagement with the engaging sheets of plastic material 1 and 2. The sealing head 17 has been heated by radiation transference of heat from the cutting knife 20 to sufficient extent that as the sealing surfaces 18a are pressed against the contacting films 1 and 2, the surfaces along the lower edges thereof will penetrate the same and the heat thereof will cause the film to be fused together to provide spaced transverse, parallel sealed surfaces corresponding to the spaced sealing surfaces 18a. An unsealed areas is provided between the spaced sealed surfaces and such unsealed area overlies the channel 9.

The solenoid 31a may be energized by an automatic timed control after such sealing operation has been performed to thereby cause the core thereof to move outwardly and move the arm 23 downwardly to thereby move the knife 20 downwardly in the channel 19 to a position where the "hot ribbon" cutter 20 will engage the area between the sealed surfaces and sever same, thereby providing a sealed edge on the package which is moved outwardly to the right of the device on a conveyor as disclosed in said copending application, Ser. No. 614,426, and leaving a sealed edge on the remaining sheets of film 1 and 2 which are connected to the storage rolls to the left of the assembly shown in the figure. Such remaining sealed edge can be engaged by the next succeeding group of articles to withdraw additional film from the storage rolls.

It will be understood that the upper and lower sealing assemblies may be reciprocatively brought together in timed sequence to provide sealing between groups of articles as they pass through the machine to carry out a continuous operation as described in said copending application.

Furthermore, it will be understood that the actuation of the solenoid 31a and the lowering of the cutting ribbon 20 will be timed so as to sever and separate packages at intervals so that two or more packages may remain joined together and not separated.

This may all be carried out by suitable automatic controls not necessary to illustrate and describe herein. After the sealing and cutting operation has been carried out, the arms 37 and 38 by suitable cam or linkage action as disclosed in said copending application, may be caused to move away from each other thereby moving the bars 5 and 10, and parts attached thereto, away from each other. As such motion is carried out, the spring 15 will relax to move the holddown member 11 back to normal position and the spring 34 will relax to move the knife 20 upwardly into the channel 19 to thereby resume the position shown in the figure. It will be noted that in such position the stop collar 14a engages the upper face of support bar 10 to limit the movement of holddown member 11 toward sealing bar 17, preventing them from contacting, thereby preventing the down jaws from being heated to the extent of sealing the film when brought into contact therewith.

It will thus be seen that we have provided a film sealing and cutting apparatus which provides for sealing along spaced parallel lines transversely of the contacting sheets of film and wherein the cutting operation is carried out by a cutting ribbon assembly recessed in the sealing head and movable outwardly thereof and wherein the sealing head is heated by radiation from the cutting ribbon assembly. The device is economical and simple in construction and operation and provides an improved and efficient sealing and cutting assembly in an automatic packaging machine, wherein groups of articles are packaged and severed in a continuous uninterrupted operation.

It will be understood that other and further devices and structures for carrying out our invention may be devised without departing from the spirit and scope of the appended claims.

Having described our invention we claim:

1. In a packaging and film cutting device;
   upper and lower supports;
   means for guiding sheets of packaging film between the supports;
   a resilient back-up member on the upper face of the lower support;
   a holddown member resiliently suspended to the upper support;
      said holddown member including spaced parallel jaws movable into engagement with the film to press same against the back-up member;
   a sealing bar suspended to the upper support between the jaws;
      said sealing bar being movable vertically outwardly of the jaws of the holddown member, and having a channel therein opening to the lower side thereof providing spaced parallel sealing surfaces on the lower side thereof arranged to come into contact with film held against the back-up member;
   a heated cutting member recessed in the channel and movable outwardly thereof;
   means to move the cutting member independently of movement of the sealing bar to move said cutting member outwardly of the channel into contact with the film disposed on the back-up member.

2. The combination called for in claim 1 wherein the cutting member is spaced from the walls of the channel whereby the sealing bar is heated by radiation from the cutting member.

3. Means for sealing and cutting two sheets of plastic film in a packaging machine comprising;
   guide means for guiding the sheets of film in close proximity;
   upper and lower gripping means arranged to be brought into pressure contact with the sheets of film therebetween;
   a transverse sealing bar disposed in one of the gripping members and arranged to move outwardly thereof and into pressure contact with the sheets after the sheets have been pressed together to seal same,
      said sealing bar having a channel formed in the lower face thereof providing spaced sealing surfaces;
   a heated transverse cutting member disposed in the channel arranged to be moved outwardly thereof into contact with the film to sever same between the sealing surfaces; and
   means to move the cutting member relative to the sealing surfaces adapted to move the cutting member into contact with the sheets of film independently of movement of the sealing surfaces.

4. The combination called for in claim 3 with the addition of
   a resilient member on the upper surface of the lower gripping member,
   said resilient member having a channel formed longitudinally thereof arranged to receive the cutting member.

5. In a packaging and film cutting device;
   upper and lower supports;
   means for guiding sheets of packaging film between the supports;
   a resilient back-up member on the upper face of the lower support;
   a holddown member resiliently suspended to the upper support,
      said holddown member including spaced parallel jaws movable into engagement with the film to press same against the back-up member;
   a sealing bar suspended to the upper support between the jaws,
      said sealing bar being movably vertically outwardly of the jaws of the holddown member, and having a channel therein opening to the lower side thereof providing spaced parallel sealing surfaces on the lower side thereof arranged to come into contact with film held against the back-up member;
   a heated cutting member recessed in the channel and movable outwardly thereof;
   at least one solenoid attached to the upper support,
      said solenoid having a core operatively connected to the end of the cutting member to raise and lower same to move the cutting member outwardly of the channel into contact with the film disposed on the back-up member.

6. The combination called for in claim 5 with the addition of spring means between the upper support and the cutting member to urge same toward the upper support.

7. In a packaging and film cutting device,
   first and second supports;
   a heated sealing member secured to the first support;
   a back-up member secured to the second support;
   a cutting member secured to the first support;
   means to move the sealing member into contact with film disposed on the back-up member; and
   at least one solenoid attached to the first support,
      said solenoid having a core operatively connected to the cutting member to move the cutting member relative to the sealing member to move the cutting member into contact with film disposed on the back-up member.

8. The combination called for in claim 7 with the addition of spaced holddown members secured to the first support on opposite sides of the cutting member; and
   means to move the holddown members relative to the sealing member such that film is gripped between the holddown members and the back-up member before the sealing member is moved into contact with the film.

9. In a packaging and film cutting device:
   upper and lower supports;
   means for guiding sheets of packaging film between the supports;
   a resilient back-up member on the upper face of the lower support,
      said resilient back-up member comprising a layer of relatively soft resilient material with overlying spaced apart strips of relatively hard resilient material;

a holddown member resiliently suspended to the upper support;
said holddown member including spaced parallel jaws movable into engagement with the film to press same against the back-up member;
a sealing bar suspended to the upper support between the jaws;
said sealing bar being movable vertically outwardly of the jaws of the holddown member, and having a channel therein opening to the lower side thereof providing spaced parallel sealing surfaces on the lower side thereof arranged to come into contact with film held against the back-up member;
a heated cutting member recessed in the channel and movable outwardly thereof;
means to move the cutting member outwardly of the channel into contact with the film disposed on the back-up member.

10. The combination called for in claim 9 wherein the relatively soft resilient material is sponge rubber or plastic material.

11. In a packaging and film cutting device;
upper and lower supports;
means for guiding sheets of packaging film between the supports;
a resilient back-up member on the upper face of the lower support;
a holddown member resiliently suspended to the upper support,
said holddown member comprising a shell-like member having a passage in the upper wall thereof and having spaced parallel jaws movable into engagement with the film to press same against the back-up member;
a suspending arm slidably extending through the passage in the holddown member, and having an end secured to the upper support;
a sealing bar secured to the suspending arm between the jaws of the holddown member,
said sealing bar being movable vertically outwardly of the jaws of the holddown member, and having a channel therein opening to the lower side thereof providing spaced parallel sealing surfaces on the lower side thereof arranged to come into contact with film held against the back-up member;
a heated cutting member recessed in the channel and movable outwardly thereof;
means to move the cutting member outwardly of the channel into contact with the film disposed on the back-up member.

12. The combination called for in claim 11 with the addition of spring means between the shell and the upper support to urge same toward the sealing bar.

13. The combination called for in claim 12 with the addition of means to limit the movement of the shell toward the sealing bar whereby the shell cannot contact the sealing bar.

14. The combination called for in claim 13 wherein the means to limit movement of the shell toward the sealing bar comprises a pin attached to the shell slidably extending through the upper support; and a stop member secured to the pin engageable with the upper face of the upper support.

References Cited

UNITED STATES PATENTS

| | | | |
|---|---|---|---|
| 2,837,883 | 6/1958 | Bracey | 53—182 |
| 2,961,031 | 11/1960 | Fener | 156—515X |
| 3,195,289 | 7/1965 | Cochrane | 53—182 |
| 3,257,256 | 6/1966 | Lehmacher et al. | 156—515X |
| 3,451,870 | 6/1969 | Pearson | 156—515X |

BENJAMIN A. BORCHELT, Primary Examiner

J. M. HANLEY, Assistant Examiner

U.S. Cl. X.R.

156—251